Jan. 2, 1951    A. R. McGARVEY    2,536,073
CONTINUOUS PROCESS OF PRODUCING MOLDED
BASIC MAGNESIUM CARBONATE
Filed Aug. 8, 1946    4 Sheets-Sheet 1

INVENTOR.
Alan R. McGarvey
by
Walter + Kaufman

Jan. 2, 1951

A. R. McGARVEY 2,536,073

CONTINUOUS PROCESS OF PRODUCING MOLDED
BASIC MAGNESIUM CARBONATE

Filed Aug. 8, 1946

EFFECT OF CONCENTRATION OF MgO IN THE SLURRY

EFFECT OF CO₂ CONCENTRATION IN CARBONATING GAS

INVENTOR.
Alan R. McGarvey
by
Walter J. Kaufman

EFFECT OF 100 CO
AS CARBONATING GAS

EFFECT OF RATE OF FLOW
OF CARBONATING GAS

Patented Jan. 2, 1951

2,536,073

UNITED STATES PATENT OFFICE 2,536,073

CONTINUOUS PROCESS OF PRODUCING MOLDED BASIC MAGNESIUM CARBONATE

Alan R. McGarvey, Manheim Township, Lancaster County, Pa., assignor to Armstrong Cork Company, Lancaster, Pa., a corporation of Pennsylvania Application August 8, 1946, Serial No. 689,141

12 Claims. (Cl. 18—47.5)

This invention relates to the production of molded light basic magnesium carbonate. More particularly, this invention relates to a continuous method of molding light basic magnesium carbonate, especially that commonly known as "85% magnesia."

Of the various types of heat insulation materials at present in use, that which is known as "85% magnesia" is of utmost importance. Various methods have been proposed for the manufacture of "85% magnesia" insulation and generally the product is obtained by molding a slurry containing about 15% of asbestos fiber and about 85% of basic magnesium carbonate.

The methods heretofore employed to mold or shape the slurry into the desired form, such as a board, a tube, or a block of insulation, have, generally speaking, been of such a nature as to be classified as a batch process. In these methods of molding the magnesia composition into the desired form, it is generally the practice to pour or otherwise introduce a slurry into the form which is of the desired size and shape and thereafter the form is heated to an elevated temperature which causes the conversion of the magnesium carbonate to basic magnesium carbonate. This conversion results in the thickening or setting of the mass into the shape of the mold.

The thus shaped product is then removed from the mold and is subjected to an elevated temperature to produce drying.

It is an object of this invention to provide a simple, continuous method of molding magnesia compositions into a desired shape.

It is a further object of this invention to provide a method for continuously molding an "85% magnesia" from thermo-setting crystals of normal magnesium carbonate.

Still another object of this invention is to provide a simple method of forming high temperature insulation from "85% magnesia," which method is capable of continuous operation and which may be carried out in comparatively simple equipment.

These and other objects of this invention will become apparent to those skilled in the art upon becoming familiar with the following description when taken in conjunction with the accompanying drawings.

In accordance with this invention, a slurry of normal magnesium carbonate, fiber and water is forced through a heated zone under such conditions that upon removal from the heated zone the slurry has set in the desired shape, which is determined by the configuration of the zone.

While the invention may be applied to slurries containing normal magnesium carbonate produced by any known method, it is particularly adaptable to the molding of slurries produced in accordance with the process described in my copending application, Serial No. 441,380, filed May 1, 1942, now Patent 2,409,297 of October 15, 1946. The present invention will therefore be described with particular reference to the molding of a slurry prepared in accordance with the process of the above-mentioned copending application.

In accordance with my above-mentioned copending application, I have found that by a proper control of conditions, products having increased hardness and strength for a given density can be made by a simple direct process without subsequent removal of water before molding the product. It has also been found possible to control the process so that no bicarbonate of magnesium is formed even after excessive carbonation. The materials resulting from my improved process do not exhibit the brittleness and fragility inherent in such as have been heretofore produced by generally similar processes, and there is no necessity of employing materials of an essentially foreign character to impart the requisite qualities desired in the product.

In accordance with the invention of my above-mentioned copending application, I have found that carbonation of a relatively concentrated slurry of the magnesium oxide or magnesium hydroxide can be effected with the production of either a tabular plate-like or a fine needle-like crystalline form of normal magnesium carbonate having self-setting properties by properly controlling the conditions of carbonation so that the temperature within the reacting mass remains as close to room temperature as possible and in no case attains a temperature above about 100° F. and preferably remains at least as low as 75° F. to 85° F.

I have found, surprisingly, that substantially no magnesium bicarbonate is formed no matter how excessive the carbonation when slurries having a dilution ranging from about nine parts up to about fourteen parts by weight of water to one part by weight of magnesium oxide are treated with dilute carbon dioxide gas, whereas, when greater dilutions are employed magnesium bicarbonate is formed immediately upon the occurrence of excessive carbonation and increases in amount steadily upon continuation of such excessive carbonation. By excessive carbonation is meant the continued introduction of carbon dioxide into the slurry after tests show that the slurry contains dissolved therein only so much magnesium as corresponds to the solubility of the normal magnesium carbonate under the operating conditions of temperature and pressure.

Figure 4:
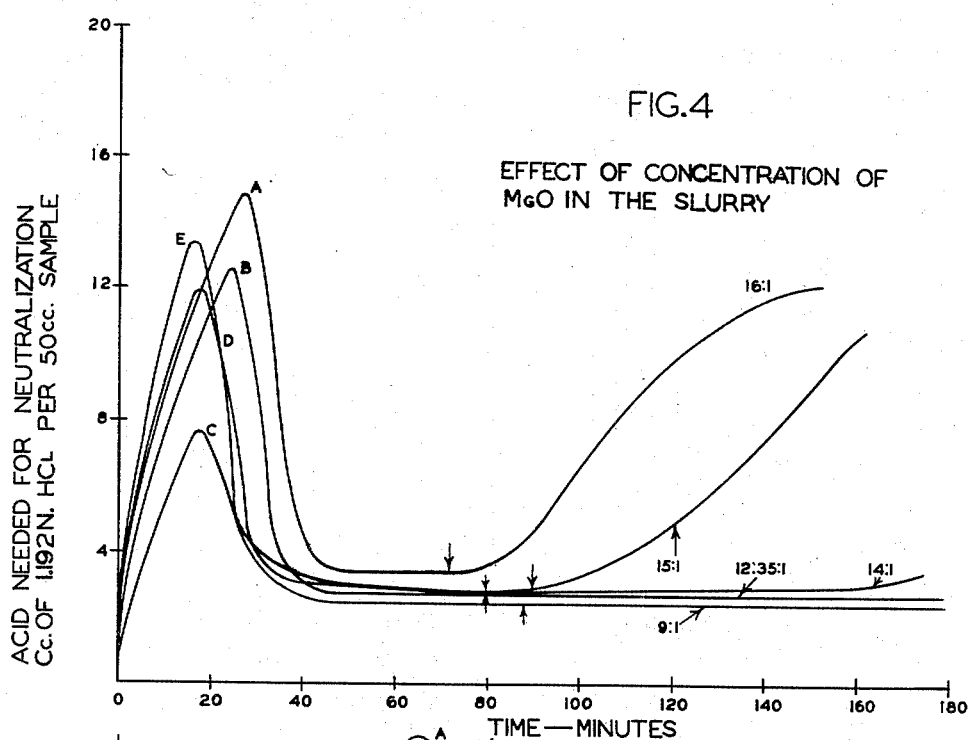
Figure 4 is a graph showing the effect of concentration of the magnesium oxide in the slurry.

In Figure 4, curves A, B, C, D, and E show the amount of magnesium compounds dissolved in five differently concentrated slurries of magnesium oxide at any particular time during the carbonation. The amount of dissolved magnesium compounds was measured by the amount of hydrochloric acid needed for neutralization of 50 cc. of the filtered slurry, using methyl orange as an indicator. The ratio of the water to magnesium oxide for each of the curves was as follows:

| Curve | Ratio $H_2O:MgO$ (Parts by Weight) |
| --- | --- |
| A | 16 to 1 |
| B | 12.35 to 1 |
| C | 9 to 1 |
| D | 15 to 1 |
| E | 14 to 1 |

For carbonating, a gas mixture containing 50% of air and 50% of carbon dioxide by volume was used. The gas was introduced at the rate of about 35 cubic feet per hour per gallon of slurry.

All of the curves start from a common origin corresponding to the normal solubility of magnesium oxide in water at the temperature employed. The humps at the left of each of the curves show that magnesium bicarbonate in considerable quantities was produced early in the reaction. During this time no normal magnesium carbonate was formed until the peaks of the humps are reached, after which the crystals of normal carbonate were formed rapidly and the bicarbonate decreased in amount until it substantially disappeared prior to the time the reaction was completed. The magnesium oxide or hydroxide content initially present decreased continually until the reaction was complete. An arrow is placed upon each curve to indicate at what time the formation of the hydrated normal magnesium carbonate was completed for all practical purposes. The two opposed arrows indicate this point for curves B and E, for the time at which the formation of the hydrated normal magnesium carbonate was completed was substantially the same. It should be noted, however, with respect to curves A and D, where dilute slurries of magnesium oxide having concentrations of 16:1 and 15:1 respectively were carbonated, that substantially at the time of completion of the reaction the formation of magnesium bicarbonate again started to take place, thereby necessitating either close control of the time of termination of the carbonation reaction or subsequent addition of magnesium oxide to neutralize the bicarbonate. Curves B, C, and E, however, show that such control or addition of magnesium oxide is not necessary when a more concentrated slurry having less than 15 parts of water to 1 part of magnesium oxide is employed in the carbonation.

In accordance with the invention of my copending application, therefore, I employ the more concentrated magnesium oxide slurries specified above and preferably a dilution of from about 12 to 13 parts of water to 1 part of magnesium oxide. Thereby, the difficulties involved in avoiding excessive carbonation and the necessity to add alkaline materials to neutralize whatever bicarbonate is formed are eliminated in my process. Furthermore, the step of washing out the bicarbonate by removing the water from the slurry at the end of the carbonation and the consequent necessity to resuspend the mass of crystals in a fresh supply of water may be eliminated. While the procedure involving reconstituting the crystals in a fresh slurry may be employed, for reasons explained more fully hereinafter such a procedure is preferably avoided, since the elimination of the agitation needed to resuspend the crystals results in the production of stronger and harder final blocks having correspondingly lighter densities and higher insulating capability.

The concentration of the slurries may be greater or lesser than 12 to 13 parts of water to 1 part of magnesium oxide; for example, a concentration of 10:1 or 14:1 may be employed. However, as the slurries become more concentrated a material having a relatively high density is obtained. When a concentration greater than 1 part of magnesium oxide to 9 parts of water is reached, the material obtained is too dense to be commercially practical. On the other hand, when less concentrated slurries are utilized the materials obtained tend to become lighter and more fragile. When a concentration of less than one part magnesium oxide to 15 parts of water is utilized, the bicarbonate is formed in excessive amounts causing fissures and gas pockets in the final product. MgO can be added to neutralize the bicarbonate, but such a procedure results in the production of a softer block than is desirable.

The preferred procedure therefore involves the elimination of the step of removing the water present during the carbonation and that of resuspending the crystals in fresh water. By proceeding in this manner, it is possible to predetermine the final density of the molded insulating material by controlling the amount of water used at the start of the carbonation; the more water used, the lighter the final molded material. However, in those cases in which these two steps are not eliminated the final density of the block can be controlled by adjusting the amount of water in the step of resuspending the crystals.

I have also found, as set forth in my copending application, that by employing the more concentrated slurries specified above, the formation of sheaves of crystals which occurs generally with the greater dilutions of the prior art is substantially eliminated. The presence of a large number of sheaves results in a denser block of weaker structure.

When the prevailing temperature throughout the carbonation does not exceed 50° F., the tabular or plate-like crystals predominate in the product, while if a temperature of about and not in excess of 70° F. prevails, the crystalline product comprises about 50% of the tabular crystals and about 50% of the needle-like crystals. At temperatures of about 74° F. or higher, no tabular crystals are produced. For the purposes of this invention, it is considered immaterial whether the tabular or the needle-like variety of crystal is formed in the process of carbonation, since it has been found that, even in those processes starting with the tabular form of crystal alone or in admixture with the needle-like variety, the tabular crystals are gradually converted into the needle-like crystals at temperatures above about 70° F., this conversion occurring with great rapidity at about 123° F. Such conversion occurs in the step during which the slurry of the crystals is heated to cause setting as will be more particularly described hereinafter. For the same reason, the crystals formed in the carbonation will be hereinafter referred to as "self-setting crystals" whether they are actually the tabular or the needle-like variety or a mixture of both since both varieties in effect set in the same manner.

However, in all cases it is highly important that the carbonation temperature be prevented from exceeding about 100° F. since it has been found that when the crystals are formed directly by carbonation of magnesium oxide or hydroxide (without the intervening step of converting all the magnesium into the form of a soluble bicarbonate and then precipitating the self-setting crystals by heating the solution in accordance with a process heretofore employed) the self-setting crystals are partially converted to the form of a basic magnesium carbonate to an appreciable extent at temperatures above about 100° F., apparently because of the fact that the self-setting crystals are formed in the presence of magnesium oxide or hydroxide. This is unexpected in view of the fact that it has been found that no appreciable change to basic carbonate occurs when self-setting crystals are produced in processes involving the heating of magnesium bicarbonate until the temperature approximates 155° F. It should be noted at this point that the crystals formed in accordance with the process of the invention of my copending application are much finer in size than such as are produced by heating magnesium bicarbonate solutions, the finer size imparting a greater strength to the final product.

The tabular crystals as well as the needle-like variety, the latter being probably in the rhombic crystallographic class, though some authorities place them in the hexagonal class, can be filtered and dried by acetone at low temperatures without any conversion to a basic carbonate form. Such dried crystals can be stored indefinitely in a dry atmosphere and can then be suspended in water and the suspension will set in the same manner as the carbonated slurries as hereinafter described. The tabular or plate-like crystals formed at low temperatures are probably the pentahydrate of the constitution $MgCO_3.5H_2O$. It is believed that the needle-like self-setting crystals have a composition corresponding to the formula $MgCO_3.3H_2O$. However, there is some authority holding that the composition of the needle-like crystals corresponds to the formula $Mg(OH).HCO_3.2H_2O$. Whatever the formula, it is known that such crystals while in the wet condition set slowly and are converted even in the cold to a form of magnesium carbonate entirely lacking the self-setting characteristics of the initially obtained crystals, which, for convenience, will be hereinafter designated by the expression "normal magnesium carbonate trihydrate" or by the corresponding formula, which is the more generally accepted designation of the substance. These crystals also set if subjected to elevated temperatures, above about 100° F., the rate of setting increasing as the temperature increases. Thorough agitation during carbonation, provided the temperature is kept low, favors the formation of the self-setting crystals or of the pentahydrate crystals which are also self-setting apparently by conversion during heating to the needle-like trihydrate crystals. These facts also account for the prior general use of slurries having great dilution, since ordinarily the bubbling of the carbon dioxide gas through the slurry was relied upon to effect agitation thereof. To effect proper agitation to insure the production of the self-setting crystals, it was necessary to use large amounts of carbon dioxide gas, and the use of such a large amount of gas, since the reaction is exothermic, produced an increased amount of heat, the necessity for the absorption and dissipation of which in turn led to the use of a large amount of water during the carbonation.

As stated previously, it is highly important that the temperature of the reaction be kept low and that adequate agitation be provided in the reaction medium. Electrolytic or colloidal substances, such as finely-divided particles of bentonite, may be added to act as nuclei for initiating the crystallization of the normal magnesium carbonate, but since such devices are not necessary for efficient crystallization, it is preferred not to employ them.

Figure 5:
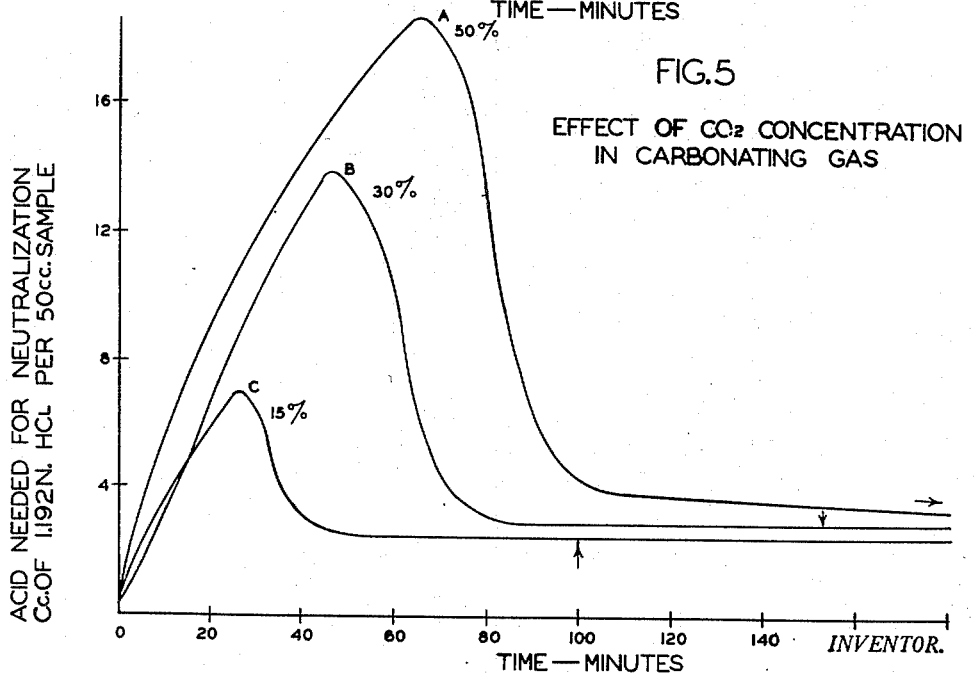
Figure 5 is a graph showing the effect of the carbon dioxide concentration in the carbonating gas.
Figure 6:
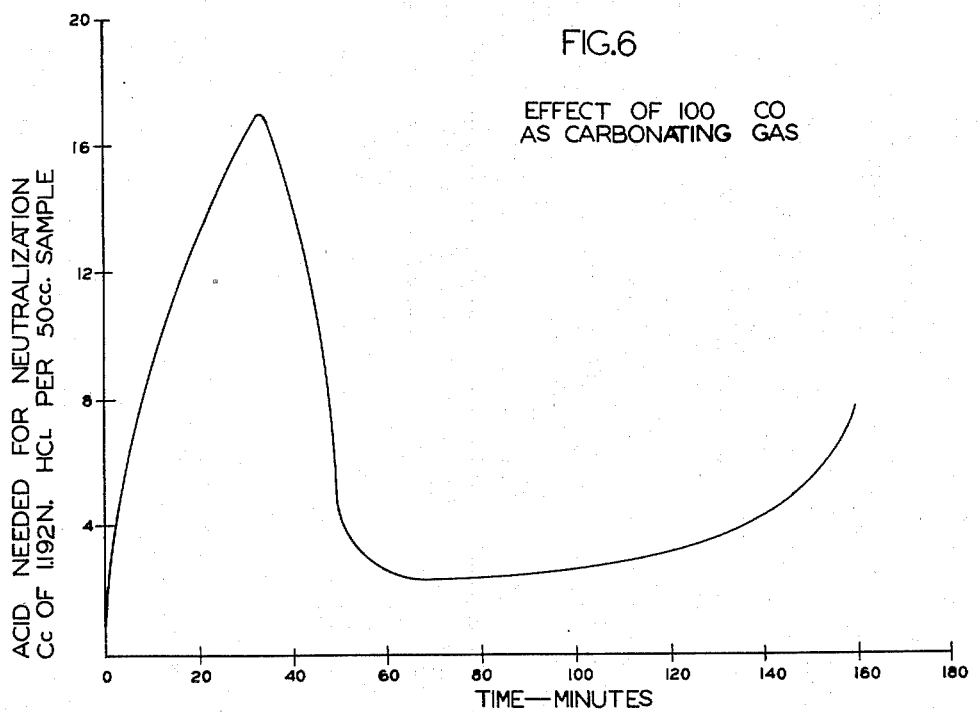
Figure 6 is a graph showing the effect of 100% carbon dioxide as the carbonating gas.
Figure 7:
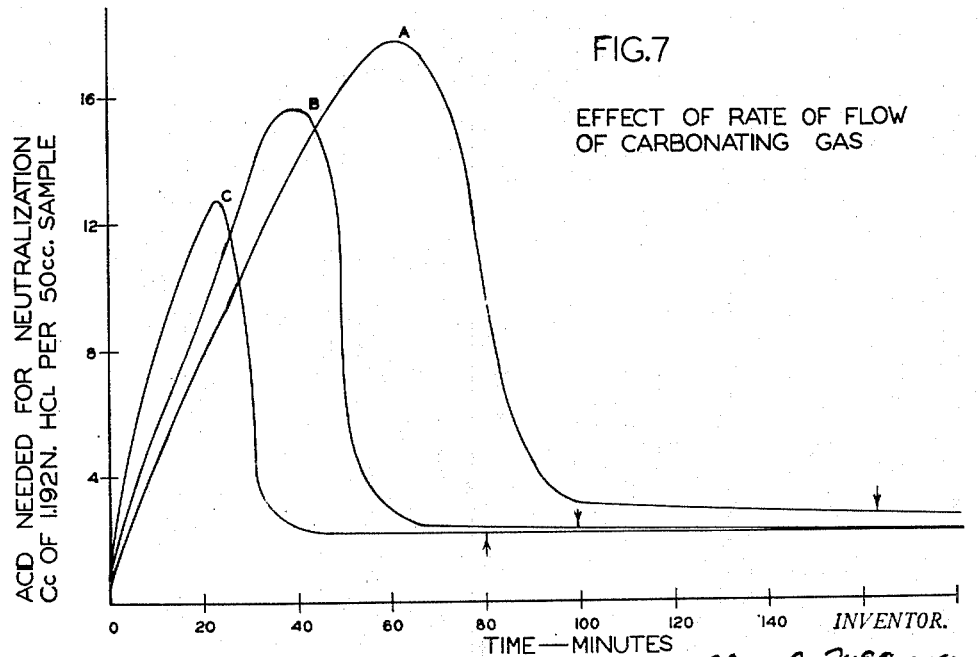
Figure 7 is a graph showing the effect of the rate of flow of the carbonating gas through the slurry.

Figures 5 and 6 illustrate the effect of the carbon dioxide concentration in the carbonating gas. In Figure 5, the slurries employed contained 12.35 parts by weight of water to 1 part by weight of magnesium oxide, and the carbonating gas was introduced at such a rate that 7.5 cubic feet of carbon dioxide per hour per pound of magnesium oxide were passed through the slurries. The concentrations of carbon dioxide in the carbonating gas were for curve A, 50%; for curve B, 30%; and for curve C, 15%. In Figure 6, a gas composed of substantially 100% of carbon dioxide was introduced at the rate of 60 cubic feet of carbon dioxide per hour per pound of magnesium oxide into a slurry having a concentration of 12.35 parts by weight of water to 1 part by weight of magnesium oxide, and shows that introduction of a highly concentrated carbon dioxide at too rapid a rate causes the formation of the bicarbonate near the completion of the reaction. Figure 7 shows the effect of the rate of flow of the carbonating gas. In the slurries shown in Figure 7, a mixture of air and carbon dioxide gas in equal amounts by volume was passed through slurries having a concentration of 1 part by weight of magnesium oxide in 12.35 parts by weight of water. In curve A, the gas was introduced at 15 cubic feet per hour per pound of magnesium oxide; in curve B, at a rate of 30 cubic feet per hour per pound of magnesium oxide; in curve C, at a rate of 45 cubic feet per hour per pound of magnesium oxide. It should be noted in connection with these curves that the reaction was completed in a shorter time with the formation of a considerably less amount of the bicarbonate in the early stages of the reaction when a higher rate of gas introduction was used.

While any dilute carbon dioxide may be employed in the process without danger of forming magnesium bicarbonate by excessive carbonation, it is preferred to use a gas which has a relatively low content of carbon dioxide, so that a great quantity of the gas may be passed through the slurry without generating an excessive amount of heat by virtue of reaction of carbon dioxide with magnesium oxide. By using such a dilute gas, thorough agitation of the reacting mass is effected, while, at the same time, the increased concentration of magnesium oxide is offset by the dilute concentration of the carbon dioxide, thereby effecting a proportionately greater amount of agitation for a given weight of carbon dioxide introduced into the reaction medium. Furthermore, the passage of the inert gases not taking part in the reaction through the reaction medium also assists in the dissipation, by convection and conduction, of the heat generated by the reaction. Any form of dilute carbon dioxide-containing gas is suitable, and as sources of such gases, there may be mentioned stack gases, the gases resulting from commercial alcohol processes, etc. The gas may be artificially produced. For example, carbon dioxide from a relatively concentrated source may be mixed with air or other available inert gas. This mixing may be effected just prior to introduction of the gas into the reaction medium by any suitable means, such as by means of an injector in which the passage of a stream of carbon dioxide flowing at high velocity is caused to entrain air just outside the reaction vessel. Similarly, a gas of relatively high concentration of carbon dioxide can be introduced into the reaction medium in close proximity to the point of introduction of inert gases, such as air, nitrogen, etc. While it is preferred to use a dilute carbon dioxide-containing gas, yet a relatively concentrated carbon dioxide-containing gas may be employed without excessive rise in temperature and without the formation of magnesium bicarbonate by excessive carbonation, provided it is introduced at a relatively slow rate. However, this involves a loss of time and, to obtain the best results, practically necessitates the employment of additional agitation, either by the introduction of an inert gas or by mechanical means. While a water jacket may be provided upon the apparatus for carbonating the slurry, it is preferred to avoid entirely any necessity to lower the reaction temperature by such means by properly controlling the conditions within the reaction system as aforesaid. The preferred embodiment of my invention, therefore, employs a dilute carbon dioxide-containing gas which functions not only by reacting with the magnesium oxide or magnesium hydroxide of the slurry to produce the desired self-setting crystals, but also by dissipating the heat and by agitating the reaction mass thereby eliminating the necessity of supplying the reaction vessels with water jackets and agitating means of a mechanical nature.

Figure 1:
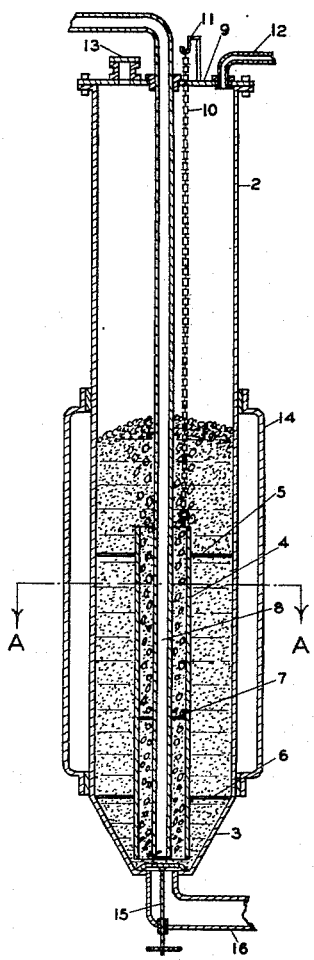
Figure 1 is an elevational cross-section view of a carbonator.
Figure 2:
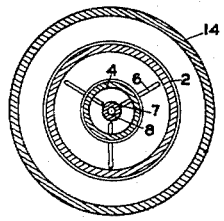
Figure 2 is a sectional view taken on line A—A of Figure 1.

To facilitate the control of the carbonation conditions in concentrated slurries of magnesium oxide and of magnesium hydroxide, I have devised the apparatus illustrated in Figures 1 and 2. The reaction vessel comprises the casing 2, preferably of cylindrical shape, terminating at the bottom in the form of a truncated cone 3, having a slope inclined at such an angle that any crystalline material tending to settle out during the reaction will not stick to the bottom but will fall to the central portion of the reaction vessel. A suitable angle of inclination is one of 60° with horizontal. A tube 4 is suspended within, and is preferably concentric with, the vessel so that its lower extremity forms with the conical wall 3 a narrow channel for the passage of the slurry therebetween. This tube is provided with upper and lower external spiders 5 and 6 respectively to maintain the tube properly centered and to act as a guide to assist the withdrawal of it from the vessel and it is provided with an internal spider 7 to maintain the pipe 8 in the center thereof. The length of the tube 4 is less than half that of the casing 2 so that the tube is well below the surface of the slurry and can be raised to a position within the casing entirely above the slurry therein. The cover 9 of the vessel is provided with a central opening through which the tube 8 extends down to the bottom of the reaction vessel. The cover also has an opening through which a chain 10 attached to the top of the tube 4 can be pulled to a suitable hook 11, thus providing for adjustably positioning the tube 4 within the vessel. Instead of the hook 11, any suitable means for adjusting the position of tube 4 within the vessel may be provided, such as a winch with a ratchet arranged to prevent or to permit the centering of the tube 4 when the respective movements are desired. The opening in the cover 9 through which the chain 10 extends may also be provided with a sealing means, such as a tube of felt or sponge rubber to prevent passage of gas therethrough. The cover 9 is provided with an outlet pipe 12 (which may be connected to the gas inlet pipe of a second carbonator) to permit the outflow (and subsequent use) of any excess gases. The cover 9 is also provided with a manhole 13 to permit the introduction of reactants. Of course, all the openings in the vessel are preferably provided with suitable gaskets or packings to make the vessel gas-tight. If desired, the vessel may also be provided with a jacket 14. The bottom of the vessel is provided with a valve 15 opening into an outlet pipe 16 to permit the removal of the products of the reaction.

In operation of the carbonator, the carbon dioxide-containing gas is directed through the pipe 8, and it flows out through openings in the side or at the end thereof into the space generally surrounded by the tube 4. The flow of the gas upward within the tube 4 carries with it that portion of the slurry already within the tube and also sucks into the bottom of the tube the slurry immediately surrounding the tube at that point. As the slurry containing the gas flows upwardly through the tube 4 there is a circulation produced in the vessel in which the flow of slurry is continuously upwards within tube 4 and then downwards between the walls of tube 4 and the casing 2. The shape of the bottom 3 of the reaction vessel, together with the sweeping action of the current produced by the gas flow, prevents any deposition of sediment of magnesium oxide, magnesium hydroxide, or self-setting crystals thereon, and provides for effective and intimate mixing of the several components of the mixture. This prevention of settling out of solids is important in that such a settling involves a change of effective concentration of the magnesium oxide in the main body of the slurry tending to make it more dilute and thus increasing the risk of formation of the undesired magnesium bicarbonate toward the end of the reaction. The presence of the pipe 8 in the center of the reaction vessel extending above the tube 4 accentuates the particular circulating current by virtue of a certain tendency of the mixture of the gases and the liquid flowing upwardly to cling, possibly by virtue of surface tension, to the pipe 8, thereafter flowing outwardly and downwardly around the inside walls of the reaction vessel. The arrangement of tube 4 provides for adequate agitation even with relatively small amounts of gas, and the circulation prevents localized rise of temperature to an excessive degree.

A plurality of the carbonators may be operated at once by suitably connecting them by means of manifolds for supplying them with gas and also for permitting the efflux of the unused gas. Obviously the carbonators may be connected either in series or in parallel, but it is preferred that they be provided with suitable manifold and bypass connections so that the gas flows in sequence through each carbonator from one to the next and so on, and so that the connections to any carbonator may be closed to permit the withdrawal of the reacted mass therefrom when the carbonation therein is complete without interrupting the introduction of the gas in sequence to the other vessels connected in series.

Carbonation of the mass under the conditions specified above is continued until substantially all of the magnesium compound content is converted to the self-setting crystals of either the tabular pentahydrate or the needle-like trihydrate crystals, and by opening the valve 15 the reacted slurry may be withdrawn into any suitable container or containers.

While the product obtained from the setting of the self-setting crystals alone is suitable as a heat insulation medium, additional strength is obtained by incorporating therein from 10% to 15% of fibers, such as asbestos. Whereas the processes heretofore employed necessitated the addition of at least small amounts of alkaline materials, such as MgO, borax, caustic soda, or lime, to the slurry of self-setting crystals to make the slurry markedly alkaline and to absorb $CO_2$ given off from $Mg(HCO_3)_2$ in order to prevent the formation of fissures in the formed blocks, it has been found that blocks made in accordance with the process of the invention are substantially free of fissures and generally are somewhat harder and stronger, without the additional amounts of MgO or alkali, than those obtained when the alkaline materials are added. While not necessary, nevertheless, a certain amount of magnesium oxide or magnesium hydroxide may be added to the slurry of self-setting crystals prior to the setting thereof. This material may be added in any amounts from as low as 1% based on the weight of the trihydrate crystals up to as high as 30% or more in the manner and for the purposes suggested in United States Patent 2,209,754 and German Patent 528,134.

The fibers or the additional magnesium oxide or both may be added to the mixture in the carbonator just prior to the end of the time necessary to substantially completely convert the initial content of magnesium oxide to the self-setting crystals. For example, the addition may be made at any time after the conversion of at least about 95% of the magnesium oxide to the self-setting crystalline form has taken place. The mixture may thereupon be made intimate by the agitation involved in completing the carbonation of the initial magnesium oxide content of the slurry. Alternatively, the fibers with or without additional magnesium oxide or other alkali may be incorporated into the completely converted slurry of self-setting crystals in a separate agitator operated mechanically or by means of the bubbling of the gas therein.

In accordance with this invention, a mixture prepared as indicated above, either in the above-described carbonator or in another type of vessel, may be molded into the desired shape by forcing the slurry first through a preheating zone the temperature of which is advantageously maintained between 150° to 180° F. and preferably between 165° to 175° F. The shape of the path through which the slurry is forced will depend, of course, upon the desired shape of the molded product. In the case of a board, the slurry may be forced through a rectangular form immersed in a heating medium such as water raised to the desired temperature. While, generally speaking, temperatures of 150° to 180° F. have been found to be particularly advantageous in preheating the slurry, the temperature of the preheating zone may vary depending, among other things, upon the particular composition of the slurry, upon the rate of flow of the slurry through the preheating zone, upon the depth of the preheating zone, and the like. In any event, it is particularly advantageous to control the conditions within the preheater and to control the rate of flow therethrough to such an extent that the temperature of the slurry upon leaving the preheater is approximately 140° F. Should a temperature greater than 140° F. be attained by the slurry, there may be a tendency of the slurry to set too completely before being molded into the desired shape. However, if the path through the preheater is of the desired shape setting during passage through the preheater would have no disadvantages. Following the preheating as described above, the slurry is then forced through a second zone which may be termed a setting zone and, in the case wherein a board is prepared, through a rectangular form heated by suitable means such as a water bath to a temperature of at least 180° F., the temperature 180° F. being obtained in the mass upon its exit from the setting zone.

As in the case of the preheating zone, the temperature of the setting bath, although advantageously maintained at between 180° to 200° F., may be varied depending upon the depth of the bath in the direction of flow of the slurry, the composition of the slurry, and the rate of flow of the slurry therethrough. In any event, the temperature of the mass upon leaving the setting bath should be at approximately 180° F.

Figure 8:
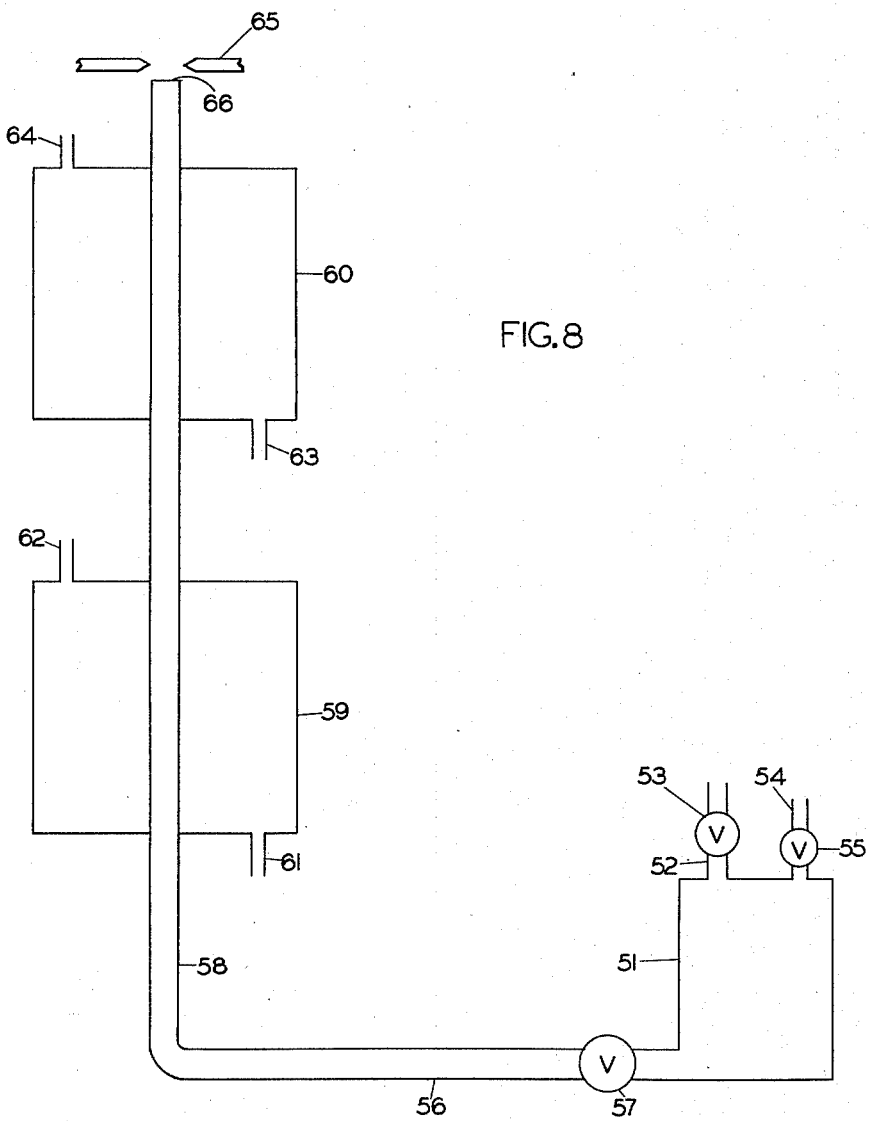
Figure 8 is a diagrammatic view of a system for continuously molding magnesium carbonate compositions.

A suitable system for continuously molding rods or blocks in accordance with my invention is illustrated somewhat diagrammatically in Figure 8.

The system of Figure 8 comprises a closed container 51, into the upper portion of which leads line 52, which is advantageously attached to a carbonator such as that described in Figure 1. Line 52 is controlled by valve 53. Also connected to the upper portion of container 51 is airline 54, controlled by valve 55. The lower portion of container 51 is connected by suitable means such as line 56, controlled by valve 57, to the pipe 58. Pipe 58 passes successively through preheater 59 and setting bath 60. Preheater 59 may be of any suitable design and advantageously takes the form of a drum through which is flowed hot water as the heating medium, the drum being provided with inlet 61 and outlet 62. Similarly, setting bath 60 may be comprised of a drum through which is passed suitable heating medium such as hot water and provided with inlet 63 and outlet 64. Line 58 passes through preheater 59 and setting bath 60 and emerges at the upper portion of setting bath 60. At any suitable distance from the point of emergence of line 59 and advantageously at the end thereof are provided cutting members 65 which are utilized to cut predetermined lengths of the extruded product.

In operation of the system illustrated in Figure 8, the slurry is admitted to container 51 by opening valve 53 in line 52. After container 51 has become substantially completely filled, valve 53 is closed and air is admitted through line 54 by opening valve 55. The admission of air into the system, and the opening of valve 57, causes the slurry to be forced through line 56 into line 58 and upwardly through preheater 59, wherein the temperature of the slurry is raised to approximately 140° F. by the time it emerges from preheater 59. The thus preheated slurry is then forced upwardly through setting bath 60 wherein the temperature causes the slurry to set into the desired shape. The set slurry is then forced up through the setting bath 60 and out at exit 66. When the desired length of product is obtained, the cutting members 65 are brought against the product to sever it from the remaining product coming from the setting bath.

While a preheater such as described above is particularly advantageous, if desired, the preheating may be dispensed with and the slurry introduced directly into the setting bath. When such a procedure is followed, the setting bath should be of such a depth as to enable the attainment of the desired end temperature by passage of the slurry therethrough.

Generally speaking, particularly advantageous results may be obtained when the passage of the material through the preheating zone and the setting zone is maintained at a very slow rate. The rate, of course, may be varied depending upon the depth of the respective zones. However, advantageous results have been obtained by maintaining the rate of flow through the zones at less than one foot per minute. Particularly advantageous results have been obtained by maintaining a rate of flow of slurry through a system in which the preheater and setting baths were about 3 feet in depth at 2 to 5 inches per minute. If it is desired to form a tubular shaped product, a suitable die may be concentrically disposed within the line 58. In such a modification, the extruded product is in the form of a tube, which may be trimmed to exact size after drying.

In order to obtain setting of the slurry in the setting bath, the depth of bath, rate of flow of slurry therethrough and the like are advantageously controlled so as to maintain the slurry within the bath for a period of between 10 to 20 minutes and preferably for a period of between 12 to 16 minutes. The time within the setting zone will of course vary depending upon the temperature thereof, but, in general, the times indicated above result in excellent products.

It is also possible in accordance with this invention to eliminate any supporting member for the setting insulation in the upper portion of the setting bath. After attaining a temperature of at least approximately 180° F. no mechanical support is necessary to aid the partially set material on its travel through the setting water.

The invention may be more readily understood by reference to the following specific examples:

Example 1

A slurry containing 53.6 lbs. of magnesium oxide in 660 lbs. of water was introduced into the carbonator and a gas containing air and 30% by volume of carbon dioxide was passed through the slurry for a period of two hours, the temperature during the carbonation attaining but not exceeding about 50° F. The slurry obtained comprised tabular crystals predominantly. The tube 4 was elevated to a position above the slurry and 18.8 lbs. of asbestos fibers were added, carbonation being continued only sufficiently to obtain intimate mixing of the fibers into the slurry of crystals. The mixture was thereupon flowed into a closed container. Air was then admitted into the container until the pressure therein reached 15 lbs. per square inch and the contents of the container were forced upwardly through a 1-inch brass pipe which passed through a container of water the temperature of which was maintained at approximately 165° to 175° F. The slurry was then forced through a section of the brass pipe immersed in a second container of water maintained at a temperature of 180° to 200° F. The rate of flow of the slurry through the tube was maintained at 3 inches per minute and a rod 1 inch in diameter and 36 inches long was cut off as the molded magnesia was forced out of the 1-inch brass pipe.

Example 2

A slurry of 53.6 lbs. of magnesium oxide and 660 lbs. of water was carbonated with a gas containing 25% carbon dioxide for a period of two hours. During the carbonation the temperature attained but did not exceed about 70° F. The crystals of the product were divided about evenly between the needle-like form and the tabular form. Carbonation was continued during the addition of about 5 lbs. of magnesium oxide and 19 lbs. of asbestos fibers until the additions were incorporated intimately therewith. The slurry was then admitted into a closed container. The pressure within the container was built up to about 15 lbs. per square inch by the introduction of air. At this pressure the slurry was forced upwardly through a brass tube immersed in a container having water therein maintained at a temperature between 165° to 175° F. The rate of flow through the preheater was maintained at 3 inches per minute. The slurry was forced further upwardly through a second bath heated at 180° to 200° F. and after passage therethrough had set into a rod which was then cut and dried at 280° F.

Example 3

A slurry containing 12 gallons of water, 7.75 lbs. of magnesium oxide, 1.6 lbs. of 10% bentonite, and 2.6 lbs. of asbestos fiber was carbonated with a gas containing 30% by volume carbon dioxide over a period of about three hours while maintaining a temperature below about 85° F. The resulting slurry was then forced by means of air through a 1-inch tube immersed in a water bath in which the water temperature was maintained between 165° to 175° F. and thereafter through a section of the pipe immersed in a water bath in which the temperature was maintained at 180° to 200° F. After passage through this system the slurry had set into a rod 1 inch in diameter. A piece 36 inches long was severed, and upon drying at 280 F. for 20 hours was firm, hard, and strong.

Figure 3:
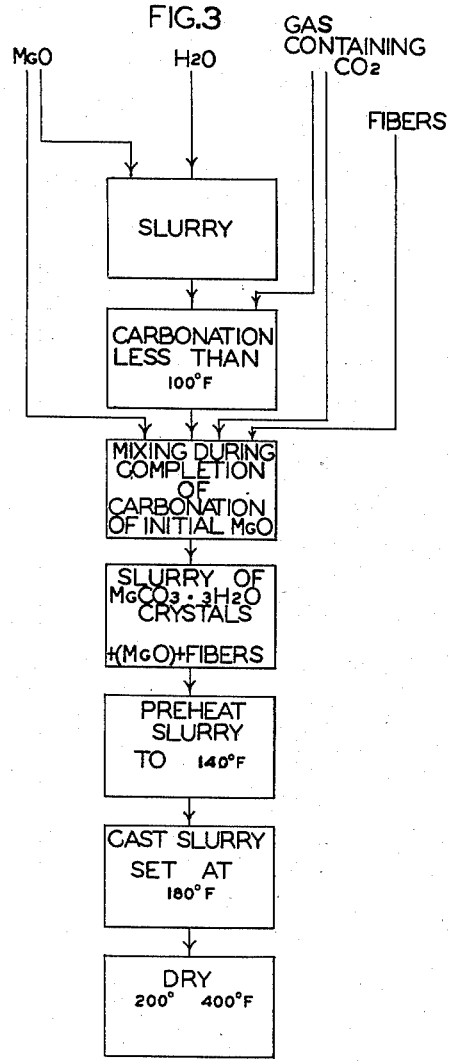
Figure 3 is a flow sheet illustrating one embodiment of my process.

Figure 3 illustrates one embodiment of the invention in general outline. In general, the procedure therein shown involves the making of a slurry of magnesium oxide in water, which is then carbonated at a temperature not over 100° F. Just prior to the completion of the carbonation of the initial magnesium oxide, additional magnesium oxide (if it is to be used) and the desired amount of fibers are added so that the product of the carbonation step is a mixture of normal magnesium carbonate trihydrate crystals with fibers with or without magnesium oxide. This slurry is preheated to 140° F. and then cast in forms where it is heated at 180° F. until set. The set forms are then dried at 200° F. to 400° F.

While this invention has been described with particular reference to the continuous molding of a slurry prepared in accordance with my above-mentioned copending application, it is to be understood that the method is applicable to any slurry containing normal magnesium carbonate in a proportion equivalent to that contained in slurries obtained in accordance with my copending application. For example, a slurry may be prepared from normal magnesium carbonate obtained by the sea-water process. In accordance with this process, sea water is evaporated in a plurality of beds to crystallize out rock salt. This leaves a solution comprised of the chlorides and sulfates of magnesium, calcium, and sodium. To this solution is added sodium carbonate, which addition results in the precipitation of normal magnesium carbonate.

Normal magnesium carbonate may also be obtained by the treatment with ammonium carbonate of various brines containing magnesium chloride. The method of my invention is applicable to slurries obtained by these or any of the other methods known to the art. However, particularly advantageous results are obtained by utilizing slurries prepared in accordance with my above-mentioned copending application in that these slurries may be continuously molded without the necessity of removing water therefrom. In other words, slurries may be prepared in accordance with the method of my copending case and continuously fed into the system of the present invention without the necessity of separating water therefrom prior to continuous molding.

In addition, although my invention has been described with reference to a particularly advantageous embodiment in which the slurry is forced upwardly through the preheater and setting zones, other systems may be utilized. For example, the tube through which the slurry is passed may run horizontally through the preheater and setting bath. In such a modification, however, care must be taken to insure the presence of sufficient slurry in the system to completely fill the tube.

It will be apparent to those skilled in the art that various changes may be made to the system illustrated. For instance, other means of maintaining the required temperature conditions in the preheater and setting bath may be utilized such as steam coils, gas, or electric heaters and the like. Also other means of forcing the slurry through the system may be used. A particularly advantageous method of obtaining the desired passage of slurry through the system is that involving the use of a screw conveyor in line 56.

While the invention has been disclosed in terms of specific examples employing certain materials in definitely stated proportions, the description is intended to be merely illustrative. Furthermore, it is not intended to limit this invention to any partcular theories expressed. It is obvious that various modifications may be made without departing from the spirit of the invention and it is to be understood that the invention is limited only by the appended claims.

This invention is a continuation-in-part of my copending application, Serial No. 441,380, filed May 1, 1942, now Patent 2,409,297 of October 15, 1946, which is in turn a continuation-in-part of application Serial No. 385,612, filed March 28, 1941, now abandoned.

I claim:

1. A continuous method of making molded insulation from magnesium carbonate compositions which comprises forming a pourable slurry containing water, fibrous material and normal magnesium carbonate crystals, forcing said slurry at low pressure through a preheating zone maintained under such conditions of temperature that upon emerging from said zone said slurry has attained a temperature of approximately 140 F., thereafter forcing said preheated slurry at low pressure through a setting zone under such conditions that said preheated slurry attains a temperature of approximately 180 F. therein, and recovering a formed article of said composition from said setting zone.

2. A continuous process of making formed articles from a composition containing magnesium carbonate which comprises forming a pourable slurry of normal magnesium carbonate crystals and asbestos fibers in water, forcing said slurry at low pressure through a confined space, the walls of which are maintained at a temperature between approximately 150 and 180 F., thereafter forcing said preheated slurry at low pressure through a continuation of said confined space in which continuation the surrounding walls are maintained at a temperature of approximately 180 to 200 F. and severing predetermined lengths of formed insulation as it emerges from said last named confined space.

3. A continuous process of preparing molded articles from compositions containing magnesium carbonate which comprises forming a pourable slurry of normal magnesium carbonate and asbestos fibers in water, slowly forcing said slurry at low pressure upwardly through a preheating zone maintained at a temperature in the range of approximately 165° to 175° F., thereby effecting a partial setting of said slurry, thereafter slowly forcing said partially set slurry at low pressure through a setting zone adapted to shape said partially set slurry and severing predetermined lengths of said shaped slurry as it emerges from said setting zone.

4. In the method of making molded basic magnesium carbonate compositions, the steps of preparing a pourable slurry of a magnesium compound selected from the group consisting of magnesium oxide and magnesium hydroxide in water, the initial concentration of the slurry being such that there are from approximately 9 to approximately 14 parts by weight of water for each part by weight of said magnesium compound based on its MgO content, introducing therein carbon dioxide gas while maintaining the said slurry at low temperatures below 100° F. until substantially all of said magnesium compound is converted to self-setting crystals generally represented as normal magnesium carbonate, thereafter forcing said slurry of self-setting crystals in water at low pressure through a preheating zone to increase the temperature thereof to approximately 140° F. forcing the thus preheated slurry at low pressure through a setting zone to raise the temperature thereof to approximately 180° F. and severing a desired length of shaped article as it emerges from said setting zone.

5. In the method of making molded basic magnesium carbonate compositions, the steps of preparing a pourable slurry of a magnesium compound selected from the group consisting of magnesium oxide and magnesium hydroxide in an amount of water between approximately 9 and approximately 14 times the weight of the MgO content of said compound, introducing therein carbon dioxide gas and controlling the rate of introduction of carbon dioxide to keep said slurry at low temperatures below 100° F. until substantially all of said magnesium compound has been converted to self-setting crystals generally represented by the formula $MgCO_3.nH_2O$ where $n$ is selected from the group 3 to 5, thereafter continuously passing the slurry of self-setting crystals in water so produced into a restricted path of desired configuration maintained at a temperature sufficient to elevate the temperature of said slurry to approximately 140° F. upon emergence therefrom while maintaining a low pressure, passing the thus preheated slurry at low pressure through a continuation of said restricted path of desired configuration maintained at a temperature sufficient to raise the temperature of the slurry passing therethrough to a temperature of approximately 180° F. and severing predetermined lengths of molded products upon emergence from said restricted path.

6. In the method of making molded basic magnesium carbonate compositions, the steps of preparing a pourable slurry of a magnesium compound selected from the group consisting of magnesium oxide and magnesium hydroxide, the initial concentration of the slurry being such that there are from approximately 9 to approximately 14 parts by weight of water for each part by weight of said magnesium compound based on its MgO content, introducing therein a gas containing carbon dioxide in dilute concentration to maintain said slurry at low temperatures below 100° F. until substantially all of said magnesium compound is converted to self-setting crystals generally represented by the formula $$MgCO_3.nH_2O$$

where $n$ is selected from the group 3 and 5, thereafter passing said self-setting crystals so produced at low pressure while suspended in approximately 9 to approximately 14 parts by weight of water to each part by weight of said magnesium compound based on its MgO content, through a preheater maintained at a temperature in the range of approximately 165° to 175° F. to partially set crystals, passing said partially set crystals through a setting bath the temperature of which is maintained between approximately 180° to 200° F. and severing desired lengths of shaped composition as it emerges from said setting bath.

7. In the method of making molded basic magnesium carbonate compositions, the steps of preparing a pourable slurry of a magnesium compound selected from the group consisting of magnesium oxide and magnesium hydroxide in an amount of water between approximately 9 and approximately 14 times the weight of the MgO content of said compound, introducing therein carbon dioxide gas while maintaining said slurry at low temperatures below 100° F. until substantially all of said magnesium compound is converted to self-setting crystals generally represented by the formula 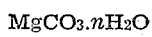$MgCO_3.3H_2O$, thereafter continuously passing through a preheater said self-setting crystals in approximately the quantity of water in which said self-setting crystals were formed and undiluted above approximately 14 parts of water for each part of said magnesium compound based on its MgO content, passing said preheated self-setting crystals at low pressure through a setting bath maintained under such conditions that the temperature of said self-setting crystals attains at least approximately 180° F., thereby forming a shaped article within said setting bath and severing desired lengths of said shaped article upon emergence from said setting bath.

8. In the method of making molded basic magnesium carbonate compositions, the steps of preparing a pourable slurry of a magnesium compound selected from the group consisting of magnesium oxide and magnesium hydroxide in an amount of water between approximately 9 and approximately 14 times the weight of the MgO content of said compound, introducing therein carbon dioxide gas while maintaining said slurry at low temperatures below 100° F. until at least approximately 95% of said magnesium compound is converted to self-setting crystals generally represented by the formula $MgCO_3.nH_2O$ where $n$ is selected from the group 3 and 5, incorporating asbestos fibers into said slurry while continuing the introduction of a gas containing carbon dioxide to effect intimate mixing of said fibers into the slurry and to complete conversion of substantially all of said magnesium compound to the self-setting crystal form, thereafter continuously passing the slurry of self-setting crystals and asbestos fibers so produced through a preheater at low pressure until a temperature of approximately 140° F. is attained therein, continuously passing said preheated slurry at low pressure through a setting bath maintained at a temperature of approximately 180° to 200° F. and severing desired lengths of molded composition upon emergence from said setting bath.

9. In the method of making molded basic magnesium carbonate compositions, the steps of preparing a pourable slurry of a magnesium compound selected from the group consisting of magnesium oxide and magnesium hydroxide in an amount of water between approximately 9 and approximately 14 times the weight of the MgO content of said compound, introducing therein carbon dioxide gas while maintaining said slurry at low temperatures below 100° F. until at least 95% of said magnesium compound is converted to self-setting crystals generally represented by the formula $MgCO_3.3H_2O$, incorporating additional magnesium oxide and asbestos fibers while continuing the introduction of said gas to effect intimate mixing of said oxide and fibers into the slurry and to complete the conversion of substantially all of the initial magnesium compound to the self-setting crystal form, continuously passing the slurry of self-setting crystals in water so produced at low pressure through a shaped form immersed in a water bath maintained at a temperature of approximately 165° to 175° F., continuously passing the preheated slurry at low pressure through a continuation of said form in a water bath maintained at a temperature between approximately 180° and 200° F. and severing desired lengths of formed article at the outlet of said continuation.

10. In the method of making molded basic magnesium carbonate compositions, the steps of preparing a pourable slurry of a magnesium compound selected from the group consisting of magnesium oxide and magnesium hydroxide in an amount of water between approximately 9 and approximately 14 times the weight of the MgO content of said compound, introducing into said slurry carbon dioxide gas while maintaining the slurry at low temperatures not in excess of approximately 50° F. until substantially all of said magnesium compound is converted to self-setting crystals generally represented by the formula MgCO$_3$.5H$_2$O, heating the slurry of self-setting crystals to a temperature not in excess of 140° F., thereafter passing said self-setting crystals so formed suspended in approximately 9 to approximately 14 times their weight in water at low pressure through a form of desired configuration immersed in a water bath maintained at a temperature in the range of approximately 180° to 200° F. and severing desired lengths of formed article as it emerges from said form.

11. In the method of making molded basic magnesium carbonate compositions, the steps of preparing a pourable slurry of a magnesium compound selected from the group consisting of magnesium oxide and magnesium hydroxide in an amount of water between approximately 9 and approximately 14 times the weight of the MgO content of said compound, introducing therein carbon dioxide gas while maintaining said slurry at low temperatures below 100° F. until substantially all of said magnesium compound is converted to self-setting crystals generally represented by the formula MgCO$_3$.3H$_2$O, thereafter continuously passing said slurry of self-setting crystals through a restricted path maintained at a temperature not in excess of 140° F., continuously passing the slurry of self-setting crystals in water so produced at low pressure through a form immersed in a bath maintained at a temperature in the range of approximately 180° to 200° F. thereby effecting rapid setting of said slurry while passing through said form, and severing desired lengths of set slurry at the outlet of said form.

12. In the method of making molded basic magnesium carbonate compositions, the steps comprising preparing a pourable slurry of magnesium oxide containing approximately 9 to approximately 14 parts by weight of water for each part by weight of magnesium oxide, introducing therein a gas containing not more than 50% by volume of carbon dioxide at a rate of flow at least as great as 7.5 cubic feet of carbon dioxide per hour per pound of said magnesium oxide while maintaining the said slurry at a temperature below 100° F. and continuing the introduction of said gas until substantially all of said magnesium oxide is converted to self-setting hydrated crystals of normal magnesium carbonate, thereafter continuously passing the slurry so formed at low pressure through a preheating zone to effect partial setting thereof, and continuously passing said partially set slurry at low pressure through a form immersed in a bath maintained at a temperature in the range of approximately 180° to 200° F. thereby effecting a setting of said partially set slurry while passing through said form.

ALAN R. McGARVEY.

REFERENCES CITED

The following references are of record in the file of this patent:

UNITED STATES PATENTS

| Number | Name | Date |
|---|---|---|
| 1,370,800 | Egerton | Mar. 8, 1921 |
| 1,602,720 | Straight | Oct. 12, 1926 |
| 1,673,685 | Johnston et al. | June 12, 1928 |
| 2,209,753 | Abrahams | July 30, 1940 |
| 2,230,309 | Reed | Feb. 4, 1941 |
| 2,303,341 | Dufour et al. | Dec. 1, 1942 |
| 2,409,297 | McGarvey | Oct. 15, 1946 |
| 2,428,555 | Cummins et al. | Oct. 7, 1947 |
| 2,434,690 | Ferla | Jan. 20, 1948 |